UNITED STATES PATENT OFFICE.

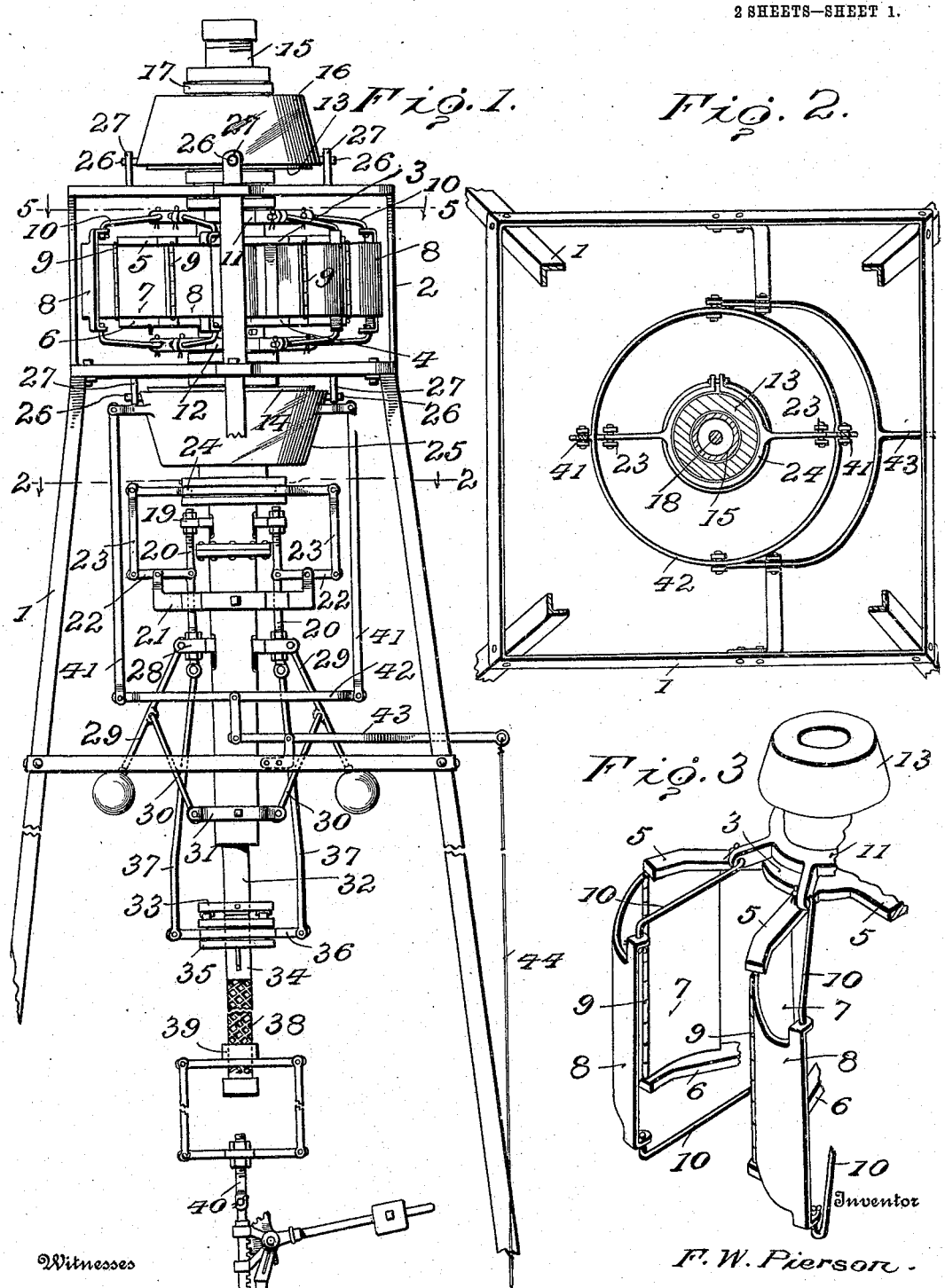

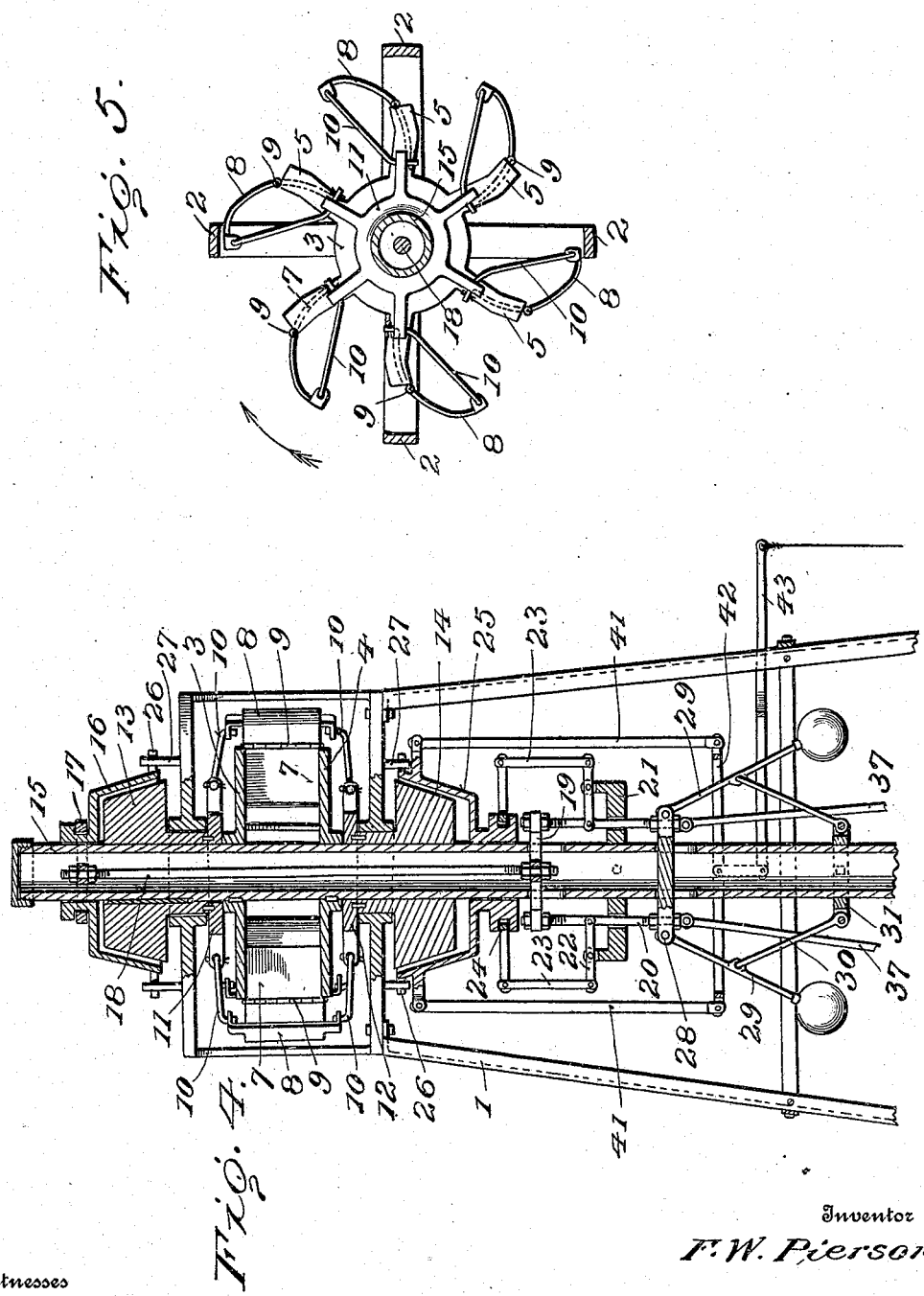

FRITZ W. PIERSON, OF MISSOULA, MONTANA.

WINDMILL AND CLUTCH THEREFOR.

No. 930,794.        Specification of Letters Patent.        Patented Aug. 10, 1909.

Application filed September 16, 1908.   Serial No. 453,339.

*To all whom it may concern:*

Be it known that I, FRITZ W. PIERSON, citizen of the United States, residing at Missoula, in the county of Missoula and State of Montana, have invented certain new and useful Improvements in Windmills and Clutches Therefor, of which the following is a specification.

This invention relates to improvements in wind mills and particularly to improved means for governing the wind mill and embodying a brake mechanism which operates automatically to stop the rotation of the wind mill at a predetermined speed thereof, the invention also embodying manually operated means for the same purpose.

For a full understanding of the invention and the merits thereof and also to acquire a knowledge of the details of construction and the means for effecting the result, reference is to be had to the following description and accompanying drawings, in which:

Figure 1 is a side elevation of a wind mill constructed in accordance with my invention, Fig. 2 is a horizontal sectional view thereof on the line 2—2 of Fig. 1, Fig. 3 is a detail perspective view of a portion of a wind wheel, Fig. 4 is a longitudinal sectional view of the upper portion of the wind mill, and, Fig. 5 is a horizontal sectional view through the wheel, the section being taken substantially on the line 5—5 of Fig. 1.

Corresponding and like parts are referred to in the following description and indicated in all the views of the drawings by the same reference characters.

Referring to the drawings, the numeral 1 designates the standards of the wind mill framework, said standards being surmounted by the open frame casing 2 in which the upper and lower heads 3 and 4 of the wind wheel are mounted for rotation. These heads are provided respectively with a number of spokes 5 and 6 between which relatively stationary sections 7 of the blades are secured in any desired way. The relatively movable sections 8 of the wind mill blades are hinged to the outer edges of the stationary sections 7, as best seen in Fig. 3, and said hinged sections 8 are connected by link rods 10 to the radial arms of the upper and lower collars 11 and 12. Upper and lower friction cones 13 and 14 are secured by keys or other means rigidly to the governing collars 11 and 12, all of these parts being mounted to turn loosely on a hollow shaft 15. The heads 3 and 4 are keyed or otherwise rigidly secured to said shaft to turn therewith. A friction cup 16 is mounted over the upper friction cone 13 and is provided with a grooved hub which is encircled by a clutch collar 17, said collar being secured to the upper end of a vertically disposed spindle 18 contained within the upper end of the hollow shaft 15. The spindle 18 carries at its lower end a cross head 19 the arms of which project outwardly in opposite directions through vertically elongated slots formed in the shaft 15. The vertical rods 20 are secured at their upper ends to the ends of the cross head 19 and extend downwardly therefrom, said rods 20 passing through openings formed in bracket arms 21 rigidly secured to the shaft 15. Relatively short levers 22 are fulcrumed intermediate of their ends on the bracket arms 21 to rock about a horizontal axis, the inner ends of said levers being secured to the rods 20, while the outer ends of said levers are connected by links 23 to a clutch collar 24. This collar 24 encircles the grooved hub of a friction cup 25 which faces upwardly as shown and which is designed to engage the lower friction cone 14. These cups 16 and 25 are held for up and down movement only by means of slotted lugs 26 formed on the cups and accommodating vertically extending pins 27 secured to the casing 2 of the supporting framework. A second cross head 28 is mounted for a limited vertical movement in vertically elongated slots formed in the shaft 15 and is secured to the lower ends of the rods 20. Centrifugally acting governor arms 29 are pivotally suspended from the ends of the cross head 28 and are in turn connected by links 30 to a collar or bracket 31 rigidly secured to the shaft 15. The lower end of the shaft 15 is provided with a reduced section 32 formed at its lower end with a clutch member 33. 34 designates a driven section of the shaft 15, said section being provided with a clutch member 35 designed for engagement with the clutch member 33 and has a spline connection with the shaft section 34. A clutch collar 36 encircles the clutch member 35 and is connected by means of links 37 with the lower extremities of the rods 20. The shaft section 34 is formed with spiral threads 38, and a correspondingly threaded nut 39 is mounted on the shaft section 34, said nut being operatively connected in any desired way to the shaft 40 of a pump, so that as the shaft section 34 turns, the nut 39 will work first up and then down on the shaft section and effect the reciprocation of the pump rod or shaft.

In the practical operation of my improved wind mill, it will be understood that as the mill is working under normal conditions, the hinged sections of the blades will be extended to an operative position where the proper effect of the wind can be obtained. As the wind mill speeds up, the governor arms 29 are caused to swing outwardly by centrifugal action and if the speed reaches a definite point, it is obvious that these arms will swing out far enough to draw downwardly upon the cross head 28, the downward movement of said arms being communicated to the upper cross head 19 and thence through the spindle 18 to the upper friction cup 16, said cup being caused to frictionally engage the upper friction cone 13. The downward movement of the cross heads 28 and 19 will also, through the rods 20, cause the levers 22 to rock in a direction to force the clutch collar upwardly and this will move the lower friction cup 25 upwardly simultaneously with the downward movement of the upper friction cup the said cups being brought to frictionally bear against their respective cones and effecting the retardation of the governing collars 11 and 12. As these collars are caused to turn, they will tend to swing the hinged section 8 of the blades inwardly to an inoperative position so as to close the wind wheel to the action of the wind and bring the same to a standstill. The downward movement of the rods 20 as above described, will be communicated to the links 37 and as these are connected at their lower ends to the clutch collar 36, it is obvious that the driven shaft section 34 will be uncoupled from the section 32 and the pump be thrown out of gear. In addition to these automatically operating mechanisms, I provide manually operable devices for effecting the brake action on the wind wheel, said devices comprising links 41 that are connected at their upper ends to the friction cup 25 and are connected at their lower ends to a circular band 42, said band in turn being connected to a brake lever 43 fulcrumed in the supporting framework and operated by a pull cord or the like.

Having thus described the invention, what is claimed as new is:

1. A wind mill, comprising a supporting framework, a hollow shaft mounted to turn therein, a wind wheel movable with said shaft and embodying a plurality of hinged blades, upper and lower collars operatively connected to said blades, upper and lower cones mounted on said shaft and connected to the respective collars, upper and lower friction cups designed to engage said cones to retard the movement thereof as the wind wheel turns, centrifugal acting governor arms operatively connected to the lower cup, and a spindle mounted in said shaft and connecting said arms to the upper cup whereby the outward movement of the arms will simultaneously move the cups into engagement with their respective cones.

2. A wind mill comprising a supporting framework, a hollow shaft mounted to turn therein, a wind wheel mounted in said framework, upper and lower friction devices arranged to impose a brake on said wheel, and means for automatically operating said friction devices, said operating means including a spindle mounted in said shaft and connected to the upper clutch device, a cross head secured to the lower end of said spindle, rods connected to said cross head, another cross head connected to the lower end of said rods, governor arms suspended from said last named cross head, a bracket secured to the shaft and having link connections with said arms, another bracket secured to the shaft above the first named bracket, levers fulcrumed on the second mentioned bracket, said levers being connected at one end to said rods, and links operatively connected to the other ends of said levers and to the lower clutch member.

In testimony whereof I affix my signature in presence of two witnesses.

FRED W. PIERSON. [L. s.]

Witnesses:
I. L. BEAULIEU,
MAX MELOCBE.